(12) United States Patent
Dossous

(10) Patent No.: US 12,366,305 B2
(45) Date of Patent: Jul. 22, 2025

(54) GAS VALVE LOCK OUT DEVICE

(71) Applicant: Consolidated Edison Company of New York, Inc., New York, NY (US)

(72) Inventor: Garry Dossous, Suffern, NY (US)

(73) Assignee: CONSOLIDATED EDISON COMPANY OF NEW YORK, INC., New York, NY (US)

( * ) Notice: Subject to any disclaimer, the term of this patent is extended or adjusted under 35 U.S.C. 154(b) by 106 days.

(21) Appl. No.: 18/487,335

(22) Filed: Oct. 16, 2023

(65) Prior Publication Data

US 2025/0122949 A1 Apr. 17, 2025

(51) Int. Cl.
F16K 35/10 (2006.01)

(52) U.S. Cl.
CPC .................... *F16K 35/10* (2013.01)

(58) Field of Classification Search
CPC .......... F16K 35/00; F16K 35/02; F16K 35/06; F16K 35/10; F16K 35/12; F16K 35/14; F16K 11/0704; F16K 17/042
USPC ........................................... 70/175, 176, 178
See application file for complete search history.

(56) References Cited

U.S. PATENT DOCUMENTS

| | | | | |
|---|---|---|---|---|
| 280,912 A | * | 7/1883 | Connolly | F16K 35/10 70/232 |
| 1,158,631 A | * | 11/1915 | Caldwell | F16K 35/10 70/180 |
| 1,332,513 A | * | 3/1920 | Morris | F16K 35/10 70/178 |
| 1,591,548 A | * | 7/1926 | Pretti | F16K 35/10 70/178 |
| 2,706,900 A | * | 4/1955 | Johnson | F16K 35/10 70/178 |
| 2,844,021 A | * | 7/1958 | Bryant | F16K 35/10 70/218 |
| 5,205,312 A | * | 4/1993 | Jerman | E03B 9/06 403/DIG. 1 |
| 5,244,008 A | * | 9/1993 | Bauer | F16K 35/04 70/180 |
| 5,400,626 A | * | 3/1995 | Villani | B60R 25/006 70/202 |
| 5,412,962 A | * | 5/1995 | Thompson | F16K 35/10 109/20 |
| 5,469,724 A | * | 11/1995 | Pollard | E03B 9/06 70/164 |

(Continued)

*Primary Examiner* — Nathan Cumar
(74) *Attorney, Agent, or Firm* — CANTOR COLBURN LLP

(57) ABSTRACT

A gas valve lock for a gas valve including a valve body having a first projection and a second projection, and a valve actuator. The gas valve lock includes a first locking element and a second locking element. The first locking element and the second locking element include a body portion having a semi-annular side portion that extends about a portion of the valve body and a cover portion that is formed with the semi-annular side portion. The semi-annular side portion includes a first edge, and the cover portion includes a second edge. A box member extends from the semi-annular side portion. The box member is receptive of one of the first projection and the second projection. A valve actuator cover extends from the cover portion. The valve actuator cover being receptive of the valve actuator. A locking member is connected to the valve actuator cover.

18 Claims, 4 Drawing Sheets

(56) References Cited

U.S. PATENT DOCUMENTS

| | | | | |
|---|---|---|---|---|
| 7,845,367 | B2* | 12/2010 | Abe | F16K 35/06 |
| | | | | 70/180 |
| 7,870,767 | B2* | 1/2011 | Brojanac | E05B 67/383 |
| | | | | 70/180 |
| 8,074,960 | B2* | 12/2011 | Milbeck | F16K 35/10 |
| | | | | 251/93 |
| 10,161,113 | B2* | 12/2018 | Tuto | E02F 9/2825 |
| 11,028,940 | B2* | 6/2021 | Trieste, Jr. | F16K 35/00 |
| 2007/0095113 | A1* | 5/2007 | Hazelett | F16K 35/12 |
| | | | | 70/178 |
| 2008/0127689 | A1* | 6/2008 | McCusker | F16K 35/025 |
| | | | | 604/9 |
| 2009/0194173 | A1* | 8/2009 | Owens | F16K 35/10 |
| | | | | 137/382 |
| 2009/0301571 | A1* | 12/2009 | Ruhs | E03B 9/06 |
| | | | | 251/65 |
| 2010/0101286 | A1* | 4/2010 | Yoon | F16K 35/06 |
| | | | | 70/175 |
| 2010/0108921 | A1* | 5/2010 | Milbeck | F16K 35/10 |
| | | | | 251/90 |
| 2011/0056567 | A1* | 3/2011 | Brojanac | F16K 35/10 |
| | | | | 137/385 |
| 2012/0085433 | A1* | 4/2012 | Agbay | F16K 35/06 |
| | | | | 137/383 |
| 2018/0017181 | A1* | 1/2018 | Ayala, Jr. | F16K 31/60 |
| 2023/0160496 | A1* | 5/2023 | Smith | F16K 7/16 |
| | | | | 70/175 |

* cited by examiner

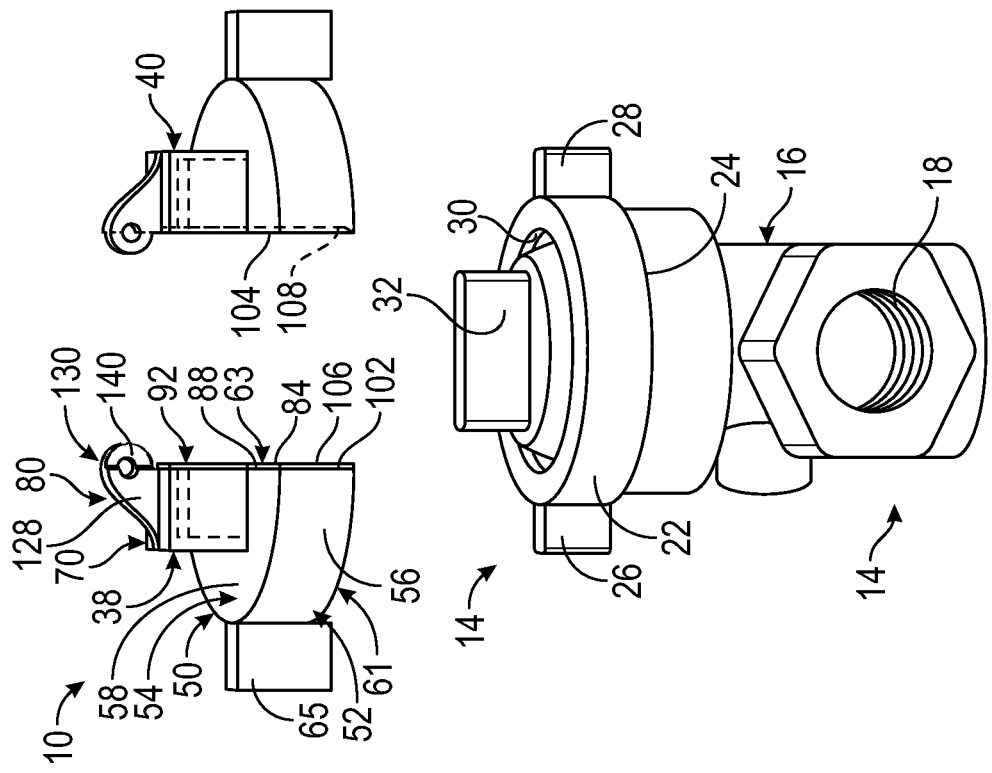
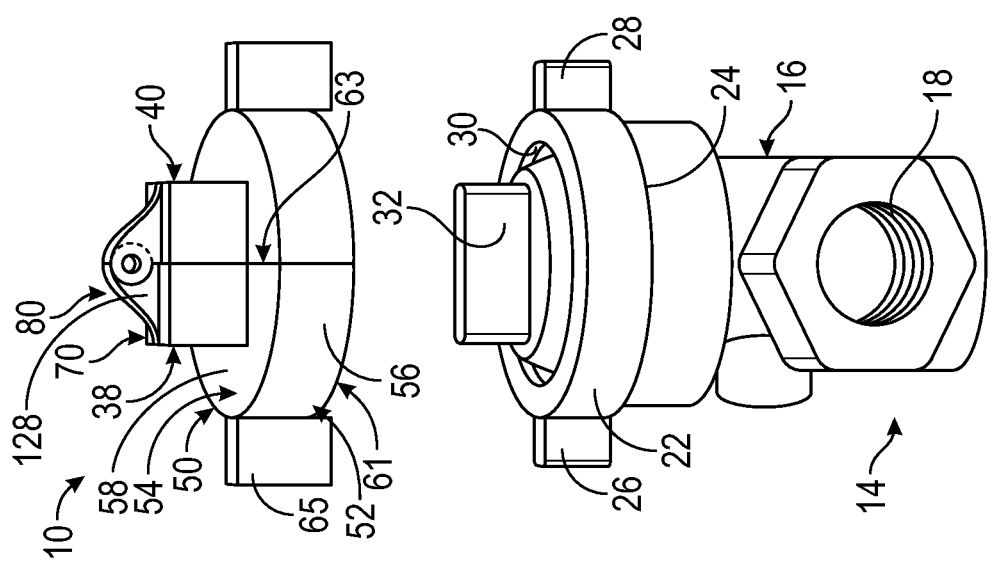
FIG. 1
FIG. 2

GAS VALVE LOCK OUT DEVICE

BACKGROUND

The subject disclosure relates to the art of gas valves and, more particularly, to a lock out device that prevents unauthorized operation of a gas valve.

Gas valves control and/or meter a flow of gas passing from a source to an appliance such as a stove, a heater, and the like. In certain cases, the gas valves may control gas flow from a utility provider to multiple consumers. Gas valves are often turned off when maintenance is being performed on supply conduits. That is, supply conduits may need periodic maintenance and/or replacement. Prior to opening a conduit, the supply of gas is turned off. Often times, the conduit being replaced is remote from the valve. As such, the valve must be secured in order to prevent an unauthorized opening.

The valve is typically secured with a locking device. The locking device prevents access to and or operation of a valve operating device. The valve operating device may be a handle that is rotated about 90° to close and/or open the valve, or handle that requires multiple rotations to change valve position. Locking devices may be as simple as a cover that is fixed to the handle with a chain or may include multiple parts that come together to encapsulate the handle and prevent rotation. Covers held with a chain are easily defeated. Covers having multiple parts that come together require multiple components that are complex to manufacture. Accordingly, the industry would welcome a valve lock that was difficult to defeat and easy to manufacture.

SUMMARY

A gas valve lock for a gas valve including a valve body having a first projection extending from the valve body in a first direction and a second projection extending from the valve body in a second direction opposite the first direction, and a valve actuator rotatable relative to the valve body and positioned between the first projection and the second projection. The gas valve lock, in accordance with a non-limiting example, includes a first locking element and a second locking element, each of the first locking element and the second locking element includes a body portion having a semi-annular side portion that extends about a portion of the valve body and a cover portion that is formed with the semi-annular side portion. The semi-annular side portion includes a first edge, and the cover portion includes a second edge. A box member extends from the semi-annular side portion. The box member is receptive of one of the first projection and the second projection extending from the valve body. A valve actuator cover extends from the cover portion. The valve actuator cover is receptive of the valve actuator. A locking member is connected to the valve actuator cover.

In addition to one or more of the features described herein, or as an alternative, further embodiments may include wherein the second edge includes a first edge portion extending from the valve actuator cover to the semi-annular side portion and a second edge portion extending from the valve actuator cover to the semi-annular side portion.

In addition to one or more of the features described herein, or as an alternative, further embodiments may include wherein the first edge portion and the second edge portion are substantially co-linear.

In addition to one or more of the features described herein, or as an alternative, further embodiments may include wherein the first edge portion includes a tab element and the second edge portion includes a tab element receiver.

In addition to one or more of the features described herein, or as an alternative, further embodiments may include wherein the tab element of the first locking element nests in the tab element receiving of the second locking element and the tab element of the second locking element nests in the tab element receiver of the first locking element when the first locking element and the second locking element are joined.

In addition to one or more of the features described herein, or as an alternative, further embodiments may include wherein the first edge of the semi-annular side portion includes a radially inwardly projecting lip.

In addition to one or more of the features described herein, or as an alternative, further embodiments may include wherein the first edge includes a locking rim that projects substantially perpendicularly from the radially inwardly projecting lip.

In addition to one or more of the features described herein, or as an alternative, further embodiments may include wherein the locking rim is configured to engage with the gas valve to prevent removal of the gas valve lock.

In addition to one or more of the features described herein, or as an alternative, further embodiments may include wherein the valve actuator cover includes a third edge including a first edge section extending from the locking member to the second edge portion in the first direction and a second edge section extending from the locking member to the second edge section in the second direction, the first edge section including a tab and the second edge section including a tab receiver.

In addition to one or more of the features described herein, or as an alternative, further embodiments may include wherein the locking member includes an opening receptive of a lock shackle.

In addition to one or more of the features described herein, or as an alternative, further embodiments may include wherein the locking member includes a step feature, wherein the step feature of the first locking element interlocks with the step feature of the second locking element.

In addition to one or more of the features described herein, or as an alternative, further embodiments may include wherein the box member includes a first inner surface and a second inner surface, the first inner surface and the second inner surface being substantially parallel.

In addition to one or more of the features described herein, or as an alternative, further embodiments may include wherein the first inner surface of the box member supports a first spring clip and the second inner surface of the box member supports a second spring clip, the first spring clip including a first curved surface and the second spring clip including a second curved surface being configured to engage with the one of the first projection and the second projection in the box member.

In addition to one or more of the features described herein, or as an alternative, further embodiments may include wherein the first curved surface comprises a first resilient curvilinear surface and the second curved surface comprises a second resilient curvilinear surface.

In addition to one or more of the features described herein, or as an alternative, further embodiments may include wherein the valve actuator cover includes a first inner surface section and a second inner surface section, the first inner surface section and the second inner surface section being substantially parallel.

In addition to one or more of the features described herein, or as an alternative, further embodiments may include wherein the first inner surface section supports a first spring clip element and the second inner surface section supports a second spring clip element.

In addition to one or more of the features described herein, or as an alternative, further embodiments may include wherein the first spring clip element includes a first curved surface and the second spring clip element includes a second curved surface.

In addition to one or more of the features described herein, or as an alternative, further embodiments may include wherein the first curved surface defines a first resilient curved surface and the second curved surface defines a second resilient curved surface.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIG. 1 is an elevational view of a gas valve and a gas valve lock, in accordance with a non-limiting example;

FIG. 2 is a disassembled view of the gas valve lock of FIG. 1;

The detailed description explains embodiments of the disclosure, together with advantages and features, by way of example with reference to the drawings.

DETAILED DESCRIPTION

Embodiments of the present disclosure provide for a system and method of locking out a gas supply valve isolate gas service so that maintenance personnel or other entities can work on downstream gas supply elements.

Figure 5:
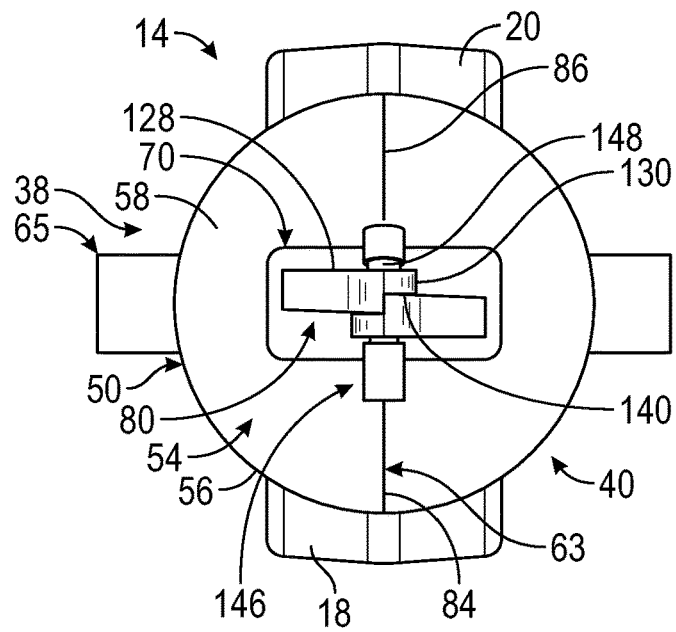
FIG. 5 is a top view of the gas valve lock secured to the gas valve, in accordance with a non-limiting example.

Reference will follow to FIG. 1 in describing a gas valve lock 10 that selectively prevents operation of a gas valve 14. Gas valve 14 includes a valve body 16 having a gas inlet 18 and a gas outlet 20 (FIG. 5). A gas cap 22 is mounted to valve body 16. Gas cap 22 includes a rim 24 supporting a first projection 26, a second projection 28, and a central opening 30. First projection 26 extends from rim 24 in a first direction and second projection 28 extends from rim 24 in a second direction that is opposite of the first direction. First projection 26 and second projection 28 may be manipulated by a user to unscrew and/or secure gas cap 22 to valve body 16.

A valve actuator 32 passes through central opening 30. Valve actuator 32 is connected to a valve member (not shown) arranged in valve body 16. The valve member controls flow between gas inlet 18 and gas outlet 20. That is, manipulation of valve actuator 32 shifts the valve member to selectively open and/or close a passage (also not shown) in valve body 16 connecting gas inlet 18 and gas outlet 20. In order to prevent unauthorized use of valve actuator 32, gas valve lock 10 is fitted to valve body 16 as will be detailed more fully herein. In a non-limiting example, gas valve lock 10 is formed from two identical components including a first locking element 38 and a second locking element 40. The use of identical components optimizes interchangeability, reduces warehousing costs, and eases the use and the maintenance of gas valve lock 10 in the field.

Figure 3:
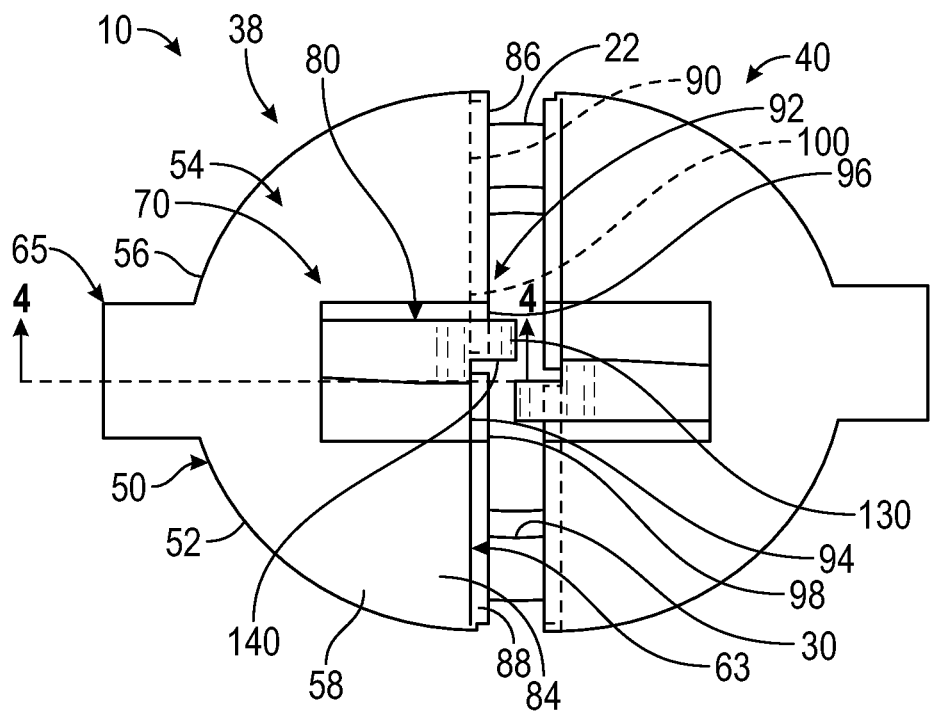
FIG. 3 is a top view of the gas valve lock positioned above the gas valve of FIG. 1, in accordance with a non-limiting example.
Figure 4:
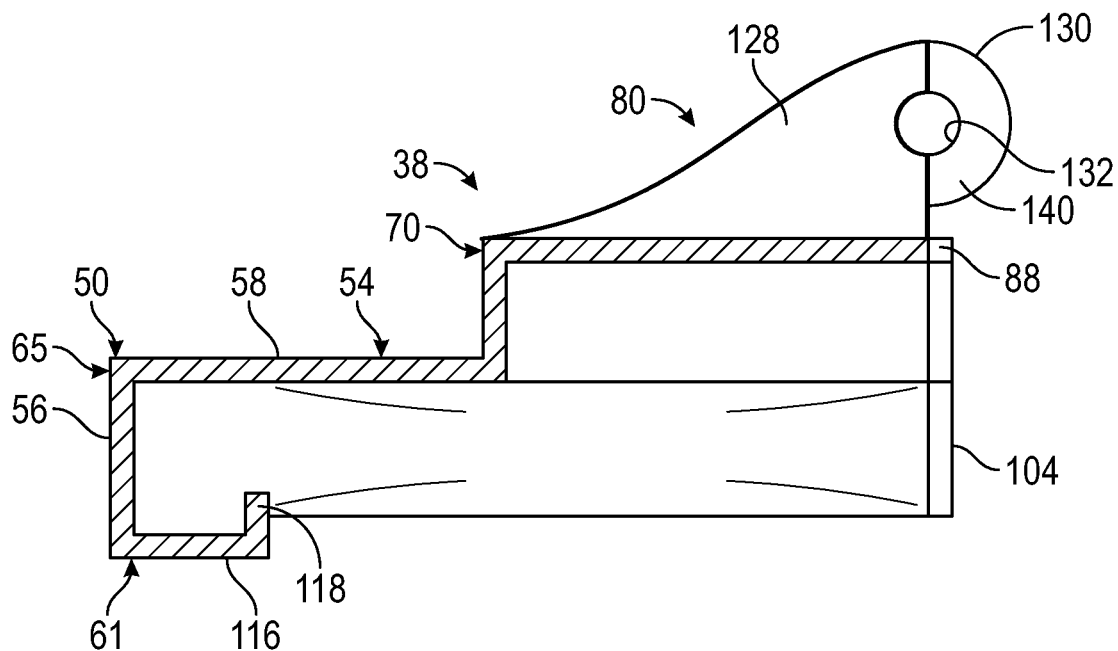
FIG. 4 is a cross-sectional view of the gas valve lock of FIG. 1 taken through the line 4-4 in FIG. 3, in accordance with a non-limiting example.

Reference will now follow to FIGS. 2, 3, and 4 in describing first locking element 38 with an understanding that second locking element 40 is identically formed. First locking element 38 includes a body portion 50 having a semi-annular side portion 52 and a cover portion 54. Semi-annular side portion 52 includes a side surface 56 that extends about a portion of gas cap 22 and cover portion 54 includes a cover surface 58 that extends over and captures a portion of valve actuator 32. In a non-limiting example, side surface 56 includes a first edge 61 and cover surface 58 includes a second edge 63. In a non-limiting example, side surface 56 includes a box member 65 that covers and captures first projection 26 and cover surface 58 includes a valve actuator cover 70 that captures a portion of valve actuator 32. First locking element 38 is also shown to include a locking member 80 which, in the non-limiting example shown, is formed on valve actuator cover 70. The location of locking member 80 may vary.

In a non-limiting example, first edge 61 includes a continuous surface that extends about side surface 56. In a non-limiting example, second edge 63 includes a first edge portion 84 and a second edge portion 86 that are substantially co-linear. First edge portion 84 extends from valve actuator cover 70 to semi-annular side portion 52 in a first direction and second edge portion 86 extends from valve actuator cover 70 to semi-annular side portion 52 in a second direction that is opposite the first direction. First edge portion 84 includes a tab element 88 and second edge portion 86 includes a tab element receiver or recess 90. In this manner, when first locking element 38 and second locking element 40 are brought together tab element 88 may nest within tab element receiver 90 creating a substantially seamless connection.

In a non-limiting example, valve actuator cover 70 includes a third edge 92 that extends between and connects first edge portion 84 and second edge portion 86. Third edge 92 includes a first edge section 94 that extends from locking member 80 to first edge portion 84 and a second edge section 96 from locking member 80 to second edge portion 86. First edge section 94 includes a tab 98 and second edge section 96 includes a tab receiver 100. In a manner similar to that discussed herein, when first locking element 38 and second locking element 40 are brought together tab 98 may nest within tab receiver 100.

In a non-limiting example, side surface 56 includes a first edge segment 102 and a second edge segment 104, shown in connection with locking element 40 in FIG. 2. First edge segment 102 extends from first edge portion 84 of cover portion 54 to first edge 61 and second edge segment 104, as shown in connection with second locking element 40 in FIG. 2, that extends from second edge portion 86 of cover portion 54 to first edge 61. First edge segment 102 includes a tab portion 106 and second edge segment 104 includes a tab portion receiver or recess 108. In a manner similar to that discussed herein, when first locking element 38 and second locking element 40 are brought together tab portion 106 may nest within tab portion receiver 108. to establish a generally seamless interface for gas valve lock 10.

In a non-limiting example, first edge 61 includes a radially inwardly projecting lip 116 including a locking rim 118 as shown in FIG. 4. Locking rim 118 engages gas cap 22 to prevent removal of gas valve lock 10. As further shown in FIG. 4, locking member 80 includes a support 128 extending from valve actuator cover 70. Support 128 includes a ring segment 130 having an opening 132. Support 128 includes a step feature 140. Step feature 140 formed in first locking member 80 on first locking element 38 engages or nests with a step feature (not separately labeled) formed in second locking element 40. As seen in FIG. 5, a lock 146 including a lock shackle 148 secures first locking element 38 to second locking element 40. That is, lock shackle 148 passes through opening 132 of locking member 80 on first locking element 38 and the locking member (not separately labeled) on second locking element 40.

Figure 6:
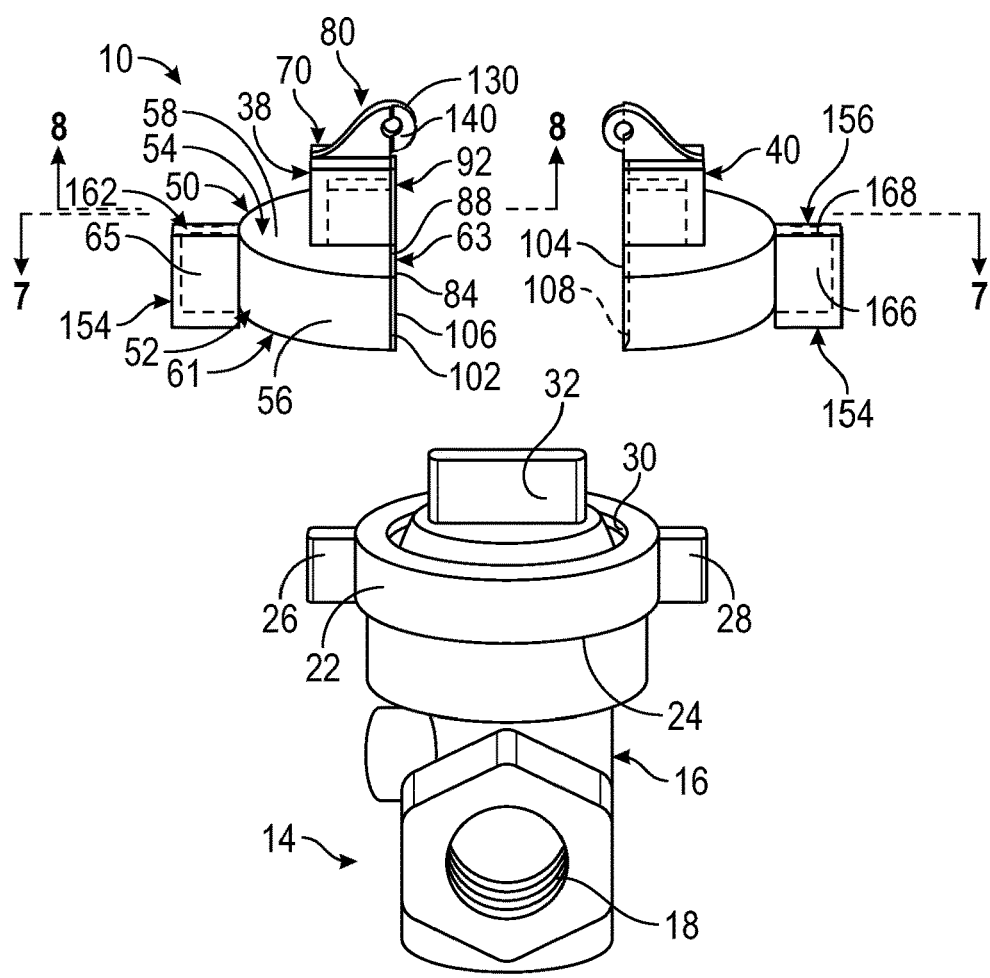
FIG. 6 is a disassembled view of a gas valve lock positioned above a gas valve, in accordance with another non-limiting example.
Figure 7:
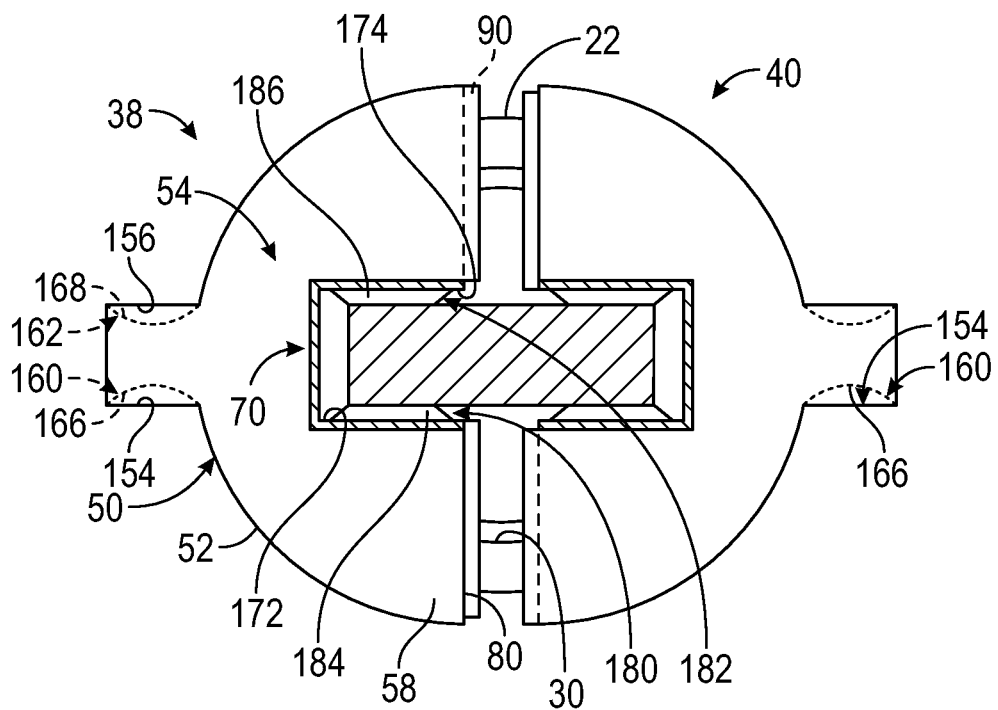
FIG. 7 is a cross-sectional view of the gas valve lock of FIG. 6 taken through the line 7-7 in FIG. 6, in accordance with a non-limiting example.
Figure 8:
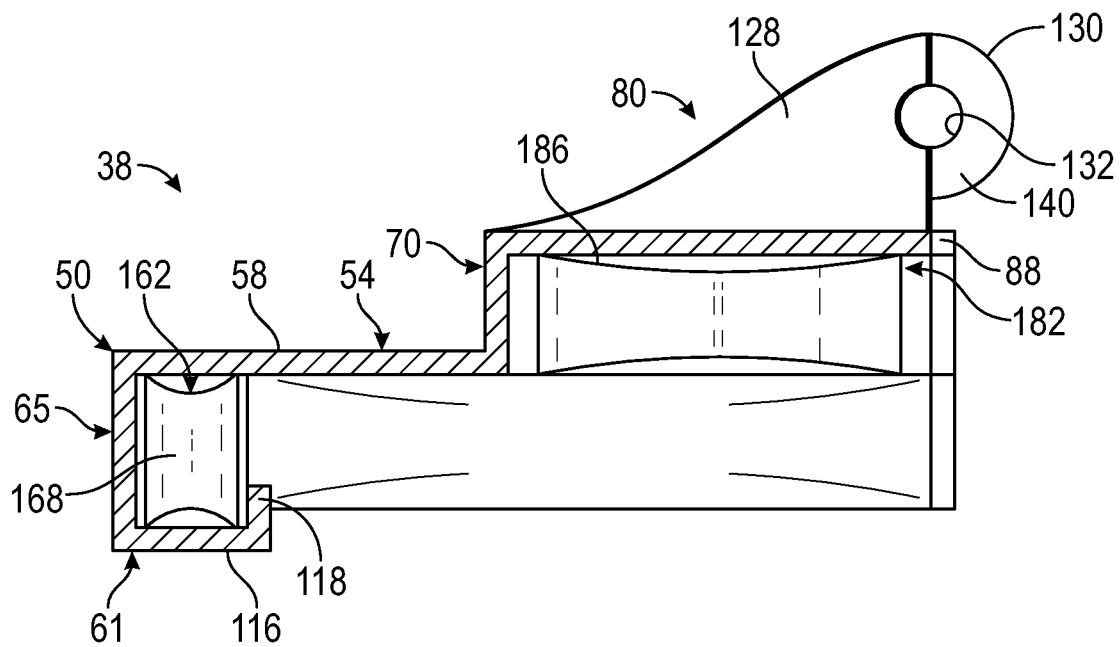
FIG. 8 is a cross-sectional view of the gas valve lock of FIG. 6 taken through the line 8-8 in FIG. 6, in accordance with a non-limiting example.

Reference will now follow to FIGS. 6, 7, and 8, wherein like reference numbers represent corresponding parts in the respective views in describing a box member 65 in accordance with another non-limiting example. Box member 65 includes a first inner surface 154 and a second inner surface 156 as shown in FIG. 7. First inner surface 154 and second inner surface 156 are substantially parallel. First inner surface 154 supports a first spring clip 160 and second inner surface 156 supports a second spring clip 162. First spring clip 160 and second spring clip 162 are configured to resiliently engage first projection 26 of gas valve 14 in box member 65. In a non-limiting example, first spring clip 160 includes a first resilient curvilinear surface 166 and second spring clip 162 includes a second resilient curvilinear surface 168 that extend into box member 65 and engage with first projection 26. First and second spring clips 160 and 162 create a more positive engagement between first locking element 38 and gas valve 14 so as to prevent tampering and easy removal.

As further shown in FIGS. 7 and 8, valve actuator cover 70 includes a first inner surface section 172 and a second inner surface section 174. First inner surface section 170 and second inner surface section 174 are substantially parallel. In a non-limiting example, first inner surface section 170 supports a first spring clip element 180 and second inner surface section 174 supports a second spring clip element 182. First spring clip element 180 defines a first curved surface that may take the form of a first resilient curved surface 184 and second spring clip element 182 defines a second curved surface that may take the form of a second resilient curved surface 186. First resilient curved surface 184 and second resilient curved surface 186 contact and trap valve actuator 32 in valve actuator cover 70. In a manner similar to that discussed herein, first and second spring clip elements 180 and 182 create a more positive engagement between first locking element 38 and valve actuator 32 so as to prevent tampering and easy removal.

At this point, it should be understood that the non-limiting examples discussed herein present a gas valve lock having two symmetrical components. The use of symmetrical components allows a technician to simply grab the two lock halves and attach to the gas valve. There is no need to hunt for specific parts, store extra components, or the like. Further the use of two identical parts simplifies manufacturing costs and complexity as well as warehousing costs.

The terms "about" and substantially are intended to include the degree of error associated with measurement of the particular quantity based upon the equipment available at the time of filing the application. For example, "about" or "substantially" can include a range of ±8% or 5%, or 2% of a given value.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Unless defined otherwise, any technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A gas valve lock for a gas valve including a valve body including a first projection extending from the valve body in a first direction and a second projection extending from the valve body in a second direction opposite the first direction, and a valve actuator rotatable relative to the valve body and positioned between the first projection and the second projection, the gas valve lock including a first locking element and a second locking element, each of the first locking element and the second locking element comprising:
   a body portion including a semi-annular side portion that extends about a portion of the valve body and a cover portion that is formed with the semi-annular side portion, the semi-annular side portion including a first edge, and the cover portion including a second edge;
   a box member extending from the semi-annular side portion, the box member being receptive of one of the first projection and the second projection extending from the valve body;
   a valve actuator cover extending from the cover portion, the valve actuator cover being receptive of the valve actuator; and
   a locking member connected to the valve actuator cover.

2. The gas valve lock according to claim 1, wherein the second edge includes a first edge portion extending from the valve actuator cover to the semi-annular side portion and a second edge portion extending from the valve actuator cover to the semi-annular side portion.

3. The gas valve lock according to claim 2, wherein the first edge portion and the second edge portion are substantially co-linear.

4. The gas valve lock according to claim 2, wherein the first edge portion includes a tab element and the second edge portion includes a tab element receiver.

5. The gas valve lock according to claim 4, wherein the tab element of the first locking element nests in the tab element receiving of the second locking element and the tab element of the second locking element nests in the tab element receiver of the first locking element when the first locking element and the second locking element are joined.

6. The gas valve lock according to claim 1, wherein the first edge of the semi-annular side portion includes a radially inwardly projecting lip.

7. The gas valve lock according to claim 6, wherein the first edge includes a locking rim that projects substantially perpendicularly from the radially inwardly projecting lip.

8. The gas valve lock according to claim 7, wherein the locking rim is configured to engage with the gas valve to prevent removal of the gas valve lock.

9. The gas valve lock according to claim 2, wherein the valve actuator cover includes a third edge including a first edge section extending from the locking member to the second edge portion in the first direction and a second edge section extending from the locking member to the second edge section in the second direction, the first edge section including a tab and the second edge section including a tab receiver.

10. The gas valve lock according to claim 1, wherein the locking member includes an opening receptive of a lock shackle.

11. The gas valve lock according to claim 10, wherein the locking member includes a step feature, wherein the step feature of the first locking element interlocks with the step feature of the second locking element.

12. The gas valve lock according to claim 1, wherein the box member includes a first inner surface and a second inner surface, the first inner surface and the second inner surface being substantially parallel.

13. The gas valve lock according to claim 12, wherein the first inner surface of the box member supports a first spring clip and the second inner surface of the box member supports a second spring clip, the first spring clip including a first curved surface and the second spring clip including a second curved surface being configured to engage with the one of the first projection and the second projection in the box member.

14. The gas valve lock according to claim 13, wherein the first curved surface comprises a first resilient curvilinear surface and the second curved surface comprises a second resilient curvilinear surface.

15. The gas valve lock according to claim 1, wherein the valve actuator cover includes a first inner surface section and a second inner surface section, the first inner surface section and the second inner surface section being substantially parallel.

16. The gas valve lock according to claim 15, wherein the first inner surface section supports a first spring clip element and the second inner surface section supports a second spring clip element.

17. The gas valve lock according to claim 16, wherein the first spring clip element includes a first curved surface and the second spring clip element includes a second curved surface.

18. The gas valve lock according to claim 17, wherein the first curved surface defines a first resilient curved surface and the second curved surface defines a second resilient curved surface.

* * * * *